United States Patent
Brady et al.

[15] 3,696,894
[45] Oct. 10, 1972

[54] ACCELERATION SENSITIVE SHOCK ABSORBER VALVE

[72] Inventors: Jack C. Brady; Kenneth J. Fewel, both of Arlington, Tex.

[73] Assignee: The United States of America as represented by the Secretary of the Navy

[22] Filed: July 2, 1971

[21] Appl. No.: 159,319

[52] U.S. Cl. .................188/275, 188/282, 188/289, 188/297, 188/322
[51] Int. Cl. ..............................F16f 9/24, F16f 9/342
[58] Field of Search......188/275, 280, 282, 284, 286, 188/297, 311, 314, 317, 322, 289

[56] References Cited

UNITED STATES PATENTS 3,338,347   8/1967   Avner.........................188/317

FOREIGN PATENTS OR APPLICATIONS

518,063   11/1955   Canada.......................188/289
1,105,327   9/1957   Germany...................188/284

*Primary Examiner*—George E. A. Halvosa
*Attorney*—Richard S. Sciascia et al.

[57] ABSTRACT

The invention disclosed is a pressurized air-oil, telescopically configured, shock absorber of the type that may be incorporated in an aircraft landing gear or other devices subject to high structural stresses caused by high impact loadings. It consists of a substantially conventional shock absorber modified to include a control valve assembly which programs the opening and closing of the piston position controlling metering orifice thereof by means of a unique valve sleeve normally spring-urged toward a closed metering orifice condition but positioned to effect the opening thereof in proportion with the magnitude of the acceleration to which it is exposed during the impact loading of the aforesaid landing gear or other devices.

16 Claims, 5 Drawing Figures

PATENTED OCT 10 1972

JACK C. BRADY
KENNETH J. FEWEL
INVENTORS

BY
Don D. Doty
ATTORNEY

JACK C. BRADY
KENNETH J. FEWEL
INVENTORS

BY
*Doak A. Doty*
ATTORNEY

ACCELERATION SENSITIVE SHOCK ABSORBER VALVE

STATEMENT OF GOVERNMENT INTEREST

The invention described herein may be manufactured and used by or for the Government of the United States of America for governmental purposes without the payment of any royalties thereon or therefor.

FIELD OF INVENTION

The present invention relates generally to shock absorbers and, in particular, pertains to an air-oil shock absorber for relieving the impact loading of a landing gear of an aircraft, as it rolls over bumps in rough field landings, or as it rolls over arresting cables on aircraft carrier decks during high-sink speed landings thereon. In even greater particularity, the subject invention is an impact alleviator that incorporates an acceleration sensitive valve mechanism, which when mounted in an air-oil type shock absorber that is attached between a large inertial mass and a relatively small inertial mass, will allow the latter to oscillate rapidly while under the influence of high accelerations without the attendant high impulse loading of the former.

DESCRIPTION OF THE PRIOR ART

Heretofore, shock absorbers have been constructed in many ways; in fact, too many ways to make a detailed discussion thereof meaningful here. Therefore, it should suffice to say that many thereof have a dashpot-like dampening mechanism therein which permits relative telescopic movement between a piston and cylinder to occur in a controlled manner, so that when certain forces are applied to the opposite ends thereof, the desired movements therebetween are effected with a slowed, cushioning action. Of course, the dashpot-like mechanisms incorporated therein are usually of the restricted compressed air or liquid flow varieties, or some combination of both.

For many practical purposes, the shock absorbers of the prior art are quite satisfactory; however, in some instances, and particularly where the respective masses interconnected thereby are very large and very small — thus having relatively large and small moments of inertia — they leave a great deal to be desired. Furthermore, the actions thereof ordinarily cannot be controlled sufficiently by the masses attached thereto alone to provide optimum relative cushioning and, at the same time, produce the optimum displacements therebetween that are required for numerous operational situations, especially with respect to high landing speeds and large heavy aircrafts.

SUMMARY OF THE INVENTION

The present invention overcomes many of the disadvantages of the prior art shock absorbers, in that it is or may be constructed in such manner as to control the shock loadings of a large variety of relatively large and small cooperating devices, during numerous different operational conditions.

Perhaps at the outset, it should be understood that the subject invention has general utility for controlling the motion of elastic suspension systems and, thus, may be designed to be used wherever shock absorbers are used. On the other hand, the preferred embodiment disclosed herein is of the type that may be incorporated to an advantage in the landing gear of an aircraft, inasmuch as it was originally invented for such purpose. Of course, disclosing it as such will allow the discussion thereof to be kept as simple as possible. Therefore, it should readily be appreciated that it would only be necessary to include design changes in the subject invention to make it useful in combination with any given associated devices, in any appropriate operational environment, or for any circumstances requiring predetermined shock absorbing functions. Obviously, the making of such designs or design changes for any given purpose would be well within the purview of the artisan having the benefit of the teachings presented herewith. Hence, without any limitation intended, the description of the invention may be summarized briefly as being a shock absorber for alleviating shock loading of effectively interconnected devices, wherein one thereof is subjected to a severe impact type of force while it is desired that the other thereof maintain a rather stable condition as a result of said shock load being gradually transferred thereto rather than being suddenly transferred thereto.

In general, it may be said that this invention incorporates the relatively moving piston and cylinder arrangement, as is already conventional in the art. Said piston and cylinder are, of course, respectively designed to connect in a suitable manner to the two devices which are intended to be relatively shock cushioned. It is of the controlled or programmed air-oil-orifice dashpot type, too; but the structural configurations of the elements effecting such arrangement are unique and constitute a new combination of elements when combined with the aforesaid well known pressurized air-hydraulic pressurized piston and cylinder arrangement, and will cause vastly improved results to be produced. For example, by employing properly designed spring loaded control weights, the size of dashpot orifices may be regulated to control the flow of dampening oil therethrough in accordance with the severity of the impact being encountered by one or both of the devices effectively interconnected by means of the instant shock absorber. As a result, the oscillatory shock transfers that occur between such devices — such as, for instance, those that occur between the fuselage and wheels of an aircraft during landing — are controlled in such manner as to provide optimum protection for both thereof because the subject invention is acceleration sensitive and responsive.

It is, therefore, an object of this invention to provide an improved shock absorber.

Another object of this invention is to provide a method and means for controlling the relative motion occurring and force transferred between a pair of effectively interconnected devices, as a result of one thereof being subjected to an impact that might otherwise disable or adversely affect the other.

Still another object of this invention is to provide an improved method and means for reducing the shock loading of predetermined devices that otherwise would be subjected to destructive impact forces.

A further object of this invention is to provide an improved aircraft landing gear shock absorber.

A further object of this invention is to provide an impact shock absorber that is sensitive to and controlled by accelerations.

Another object of this invention is to provide a method and means for protecting an aircraft during landing.

Still another object of this invention is to provide a method and means for safely transferring kinetic energy from a mass having small inertia to a mass having relatively large inertia when said mass having a small inertia is subjected to impact forces.

Another object of this invention is to provide an acceleration sensitive shock control valve mechanism that may be incorporated to an advantage in many otherwise conventional shock absorbers.

Other objects and many of the attendant advantages will be readily appreciated as the subject invention becomes better understood by reference to the following detailed description, when considered in conjunction with the accompanying drawings.

DESCRIPTION OF A PREFERRED EMBODIMENT

Figures 1, 2, 5:
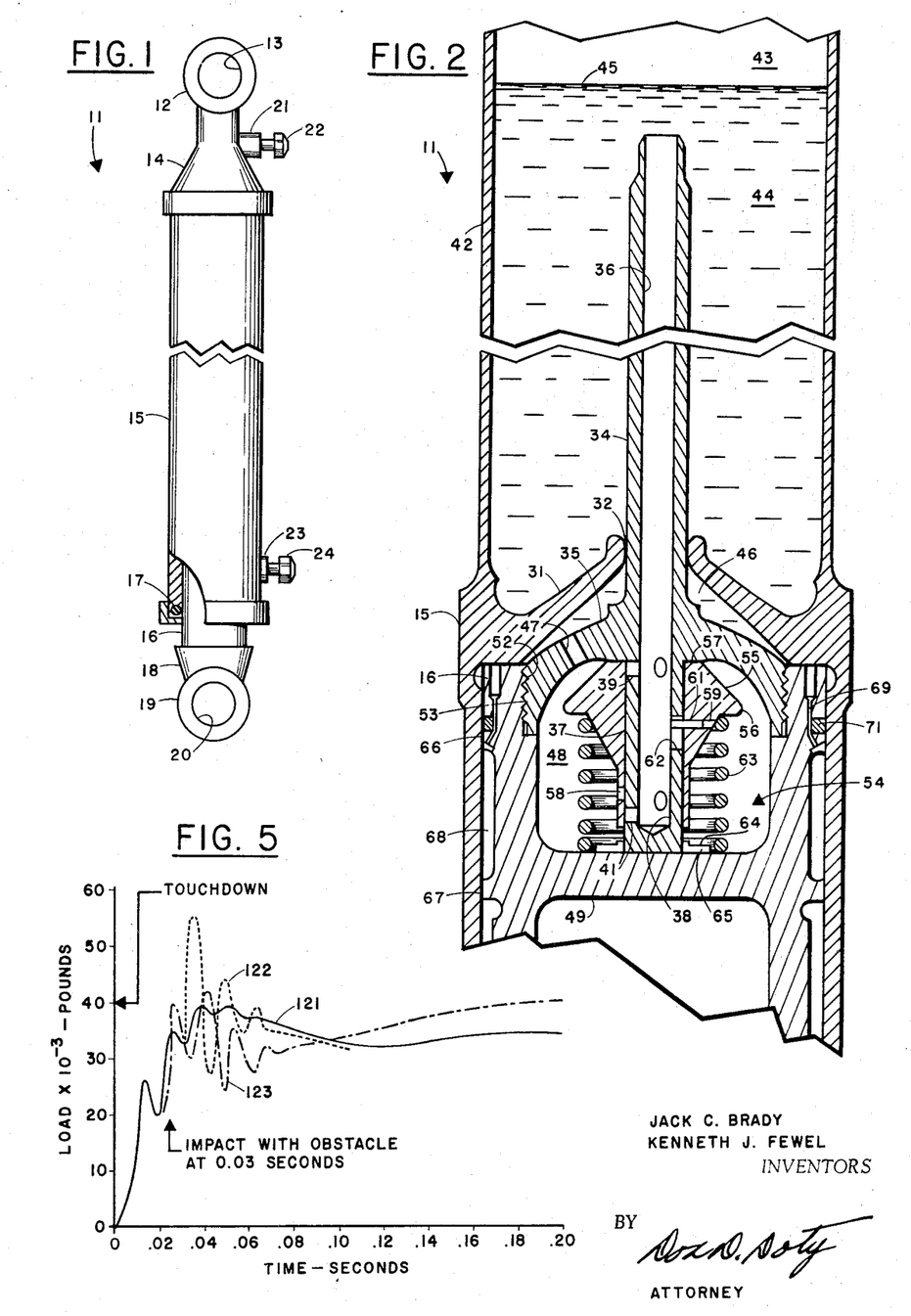
FIG. 1 is a quasi-pictorial view of a typical shock absorber incorporating the subject invention.
FIG. 2 is an elevational view of a cross section of the acceleration sensitive shock absorber valve assembly incorporated in the shock strut of FIG. 1, illustrated in its most compressed condition.
FIG. 5 is a graphical representation of shock strut loads vs. time, with and without the subject invention.

Referring now to FIG. 1, there is shown a representative shock absorber 11 of the telescopic variety and of the type that may be incorporated in an aircraft landing gear or any other mechanism, mechanisms, or systems subject to impact or oscillatory forces. As may readily be seen, the external appearance and construction thereof may, if so desired, be conventional, with the exception of the incorporation of the unique valve assembly to be discussed below. Accordingly, shock absorber 11 contains a ring-like attaching member or eye connector 12 having a hole 13 therethrough adapted for receiving a bolt or journal (not shown) which is ordinarily attached to one of the cooperating devices between which it is desired to control shock loading.

Connector 12 is integrally attached to an end tube-like cap 14, the outer extremity of which is closed, and the inner extremity of which is an internally threaded or otherwise capable of being connected to a cylinder 15, which likewise may be threaded at the external end thereof for such purpose. Within cylinder 15 is disposed a slidable piston 16 which extends through a conventional packing gland or other seal 17 out the other end thereof. As such, the aforesaid cylinder-piston arrangement is usually considered to be an elongatable compression type shock strut, especially when it is associated with an aircraft. Attached to the end of piston 16 is a connecting rod 18, and connected thereto is another eye connector 19, likewise having a hole 20 therethrough adapted for receiving a bolt or journal (not shown) that is ordinarily connected to the other of the aforementioned devices between which it is desired to control shock loading.

Located on wall of end cap 14 is a boss 21 with a hole or passageway therethrough, and inserted therein is a fitting 22, adapted for attaching a compressed air or other pneumatic tube or hose thereto. Also, located on the wall of cylinder 15 is another boss 23 with a hole or passageway therethrough, and another fitting 24, adapted for attaching an oil or hydraulic fluid line thereto, is inserted therein.

At this time, it should be understood that, with the exception of the internal structures of the aforesaid telescopically disposed cylinder 15 and piston 16, and the hydraulic valve assembly incorporated therein, all of the other parts of shock absorber 11 are well known and conventional per se. Nevertheless, as previously suggested, when said conventional parts are combined in the unique manner with said cylinder-piston-valve assembly about to be disclosed, they form a new combination of elements heretofore unknown which, for many practical purposes, produces vastly improved results heretofore not obtainable from the prior art.

FIG. 2 depicts only the section of shock absorber 11 which contains the interacting cylinder-piston-valve assembly mentioned above. Accordingly, said section contains the aforementioned cylinder 15 and piston 16; and, hence, for the sake of clarity and simplicity of disclosure, they will be identified by the same reference numerals, respectively. In this figure, the shock absorber is shown as being in its most compressed condition, in order to be structurally clear and yet not require more drawing space then is available.

As may readily be seen in FIG. 2, cylinder 15 contains an inner wall 31, which is preferably shaped in a somewhat conical fashion, the peak or apex of which theoretically extends upwardly at the center thereof. However, at the apex center of wall 31 and extending therethrough is a metering hole or orifice 32, the size of which is varied by a tapered pipe-like metering pin 34 that is slidable therein. Metering pin 34 is integrally connected to the top of a head portion 35 of piston 16 in such manner that the hollow 36 thereof constitutes a hydraulic fluid passageway therethrough. A pipe 37 is also connected to head 35 in such manner that the hollow 38 thereof coincides with and thus constitutes an extension of passageway 36. Preferably, the design of cylinder 15, piston 16, metering pin 34, and pipe 37 should be such that the center or longitudinal axis thereof substantially coincide with the longitudinal axis of sheet absorber 11 itself.

As viewed in FIG. 2, the upper end of metering pin 34 is open, and the lower end of pipe 37 closed. However, disposed at predetermined positions along pipe 37 are upper and lower metering orifices 39 and 41, respectively.

Integrally connected to the upper end of cylinder 15 is a housing 42, which, for all practical purposes, could be considered as an extension of said cylinder. However, its purpose is to provide a chamber which, in turn, acts as a reservoir for compressed air 43 and for a liquid pool of oil or hydraulic fluid 44, the level of which during normal operation is such that the upper open end of pipe 34 remains below the surface 45 thereof.

In this particular preferred embodiment, head 35 is domed in such manner that the upper surface is substantially compatible with the lower surface of wall 31 and still leaves a high pressure chamber 46 of predetermined space or volume therebetween when piston 15 is in its uppermost position in cylinder 16. Of course, as will be described more fully below, a portion of the aforesaid hydraulic oil 44 is disposed in chamber 46.

Piston head 35 has a plurality of control parts 47 — preferably three disposed at 120 degree intervals therearound — extending through it in such manner that high pressure chamber 46 is always effectively connected to a valve chamber 48 located immediately below head 35 within piston 16. The lower closure of said chamber is, of course, a solid wall 49.

For the purpose of facilitating the construction of the subject invention, piston 16 has been designed to have a removable head-skirt assembly. Hence, the upper end of the skirt of piston 16 contains internal threads 52, and the outer diameter of head 35 has external threads 53 that are complementary therewith. Thus, by merely screwing head 36 into the top skirt of piston 16, valve chamber 48 is formed. Obviously, such construction allows a control valve assembly 54 to be installed and removed expeditiously during manufacture and maintenance thereof.

The principle of construction and operation of valve assembly 54 is exceedingly simple but, yet, profound, because it causes such excellent results to be effected by the entire shock absorber constituting this invention. An inertial sleeve or body or revolution 55, preferably made of metal having a predetermined mass, has a bearing bore therethrough along the longitudinal axis thereof. Because body 55 is mounted on — and intended to be slidable on — pipe 37, the inside diameter thereof should be such as to provide a slip-fit bearing between it and the outside surface of pipe 37, while allowing for some of hydraulic fluid 44 to provide inherent lubrication therefor.

Perhaps it may be noteworthy that body 55 is somewhat top-shaped having a winged or flanged portion 56, since such geometrical configuration allows easy assembly of the other elements cooperating therewith; however, it should be appreciated that it is not intended that the shape be limited thereto, inasmuch as it would be obvious to the artisan to design other workable configurations, as well. Nevertheless, it has a flat upper face 57 which will abut that portion of the lower surface of head 35 that immediately surrounds pipe 34. It also contains a plurality of holes 58 — the number of which is identical to the number of the aforementioned lower metering orifices 41 in pipe 37 — which are located along the length thereof at such distance from the top, flat end thereof that, when body 55 has moved downward sufficiently to uncover upper metering orifices 39, lower metering orifices 41 are uncovered, too. Hence, it may readily be seen that hollow metering pin 34, slidable body 55, and orifices 39 and 41 cooperate in a sleeve-valve fashion to timely permit hydraulic oil to pass from chamber 48, through pipe 37, through metering pin 34, and into reservoir 44 in housing 42.

To limit the rotational travel of body mass 55, a hole 59 is located therein which is preferably normal to the longitudinal axis thereof. Within hole 59 is disposed a snugly fit but removable key or guide pin 61, which slidably fits in a restrictive groove 62 located in line therewith in lower pipe 37. Hence, body 55 can move up and down to the extent permitted by the length of groove 62, and when so doing, keeps holes 58 in line with orifices 41 to effect the coincidence thereof during high acceleration periods. A coil type control spring 63 is disposed around body 55 between a predetermined surface of the aforesaid flange 56 (the surface of which, of course, is contingent upon the geometrical configuration thereof) and the surface 64 of a stop flange 65 that may either be attached to the end of pipe 37 by any convenient means or abut the aforesaid wall 49. Body 55, on the one hand, must be long enough to simultaneously cover the aforesaid upper and lower metering orifices 39 and 41 when it is in its abutment position with the underside of head 35; on the other hand, it must be short enough to allow it to slide on pipe 37 to simultaneously uncover said upper and lower metering orifices 39 and 41 before it reaches the limit of its downward travel.

The external surface configuration of the housing portion of piston 16, which extends down into the lower portion of cylinder 15, is or may be conventional, in that, effectively, there are several bearing surfaces 66 and 67 on the former which are slidable on the inside surface of the latter. Of course, there is a snug fit and a seal ring 71 therebetween to prevent the excessive bypassing of hydraulic oil therebetween but still provide some lubrication thereat.

As is conventional in telescopic air-oil shock absorbers for hydraulic fluid control purposes during normal operation, a chamber 68 (surrounding piston 16) is provided. Because it is normally adjacent to filler hydraulic fitting 24, it is thus filled with hydraulic fluid which, in turn, flows through the conventional flow check means 69 in such quantities as to provide suitable pressure release between chamber 46 and 68 as would be required for normal support during non-impact conditions.

It should perhaps be noteworthy that the telescopic construction of those parts of the subject shock absorber not directly or indirectly interacting with the aforesaid valve assembly 54 may be so designed as will facilitate its being used as a shock absorber for any particular device, including any particular aircraft. Obviously, it would be well within the purview of one skilled in the art having the benefit of the teachings presented herewith to make the necessary design choices to construct a shock absorber for any desired use. Therefore, the specific structural configurations illustrated in FIG. 1 and 2 should not be considered to be limiting but, instead, merely representative of types which may be employed to an average wherever it is desired to cushion or dampen impact forces.

Figures 3, 4:
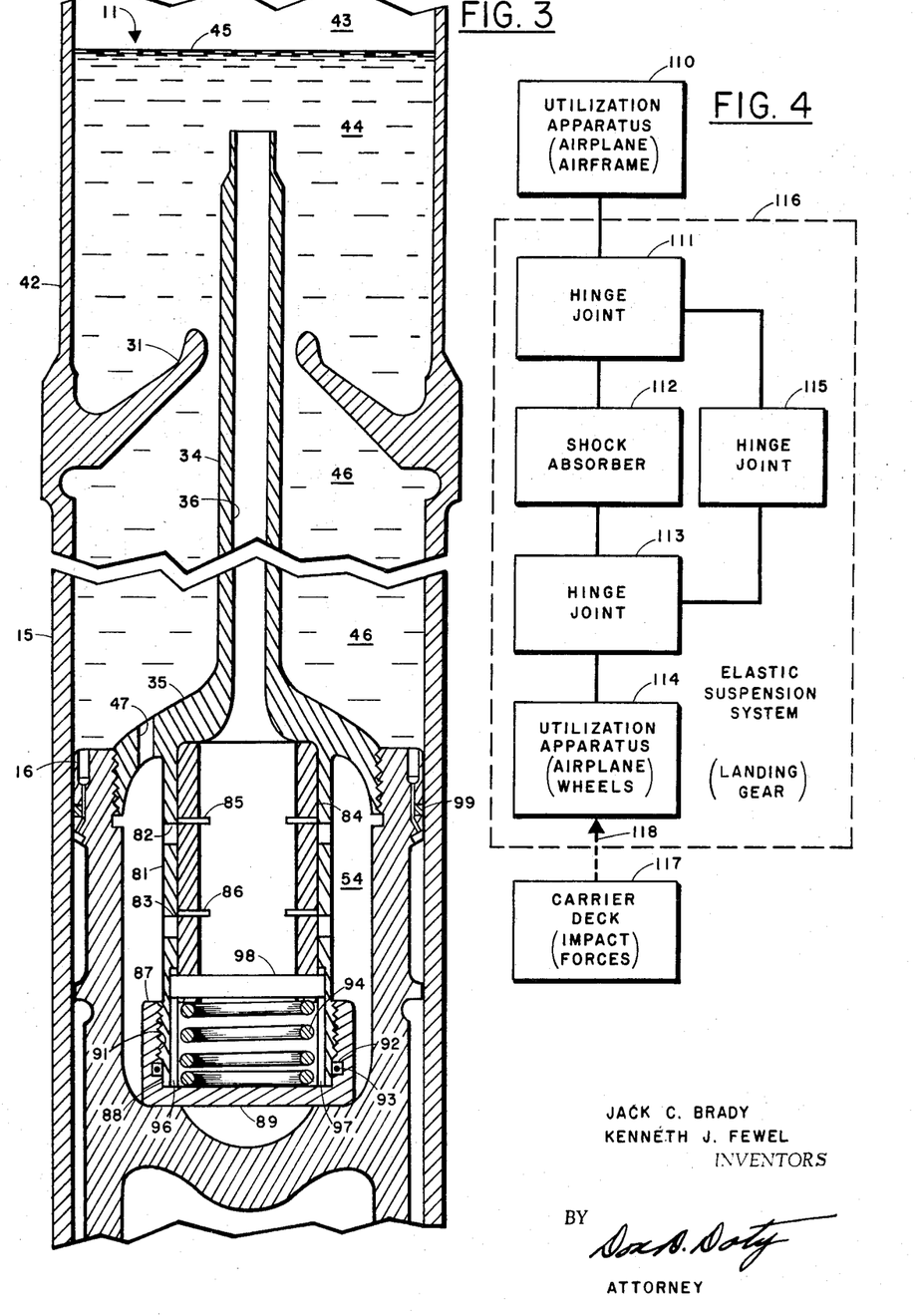
FIG. 3 is an elevational view, mostly in cross section, of another preferred embodiment of the acceleration sensitive shock absorber valve assembly incorporated in the subject invention, illustrated as it is disposed in a partially elongated position.
FIG. 4 is a block diagram of a generalized representation of an elastic suspension system that may incorporate the shock absorber of this invention to an advantage.

Referring now to FIG. 3, there is shown another preferred embodiment of the subject invention. From a structural standpoint, it is similar to the shock absorber illustrated in FIG. 2, with the exception of those parts pertaining to the acceleration sensitive control valve portion thereof. Hence, for the sake of simplicity of disclosure, only said control valve portion will be described, and in so doing, the reference numerals used in FIG. 1 will be used for like parts, insofar as it is expedient to do so, and only as needed for clarity.

As may readily be seen, the shock absorber of FIG. 3 is depicted in intermediately elongated condition — rather than in a completely compressed condition, as depicted in FIG. 2 — in order to disclose the relative disposition of the various and sundry elements from a slightly different perspective.

Due to the aforesaid elongation, as shown in FIG. 3, piston 16 is located lower in piston 15 and hydraulic fluid 44 fills high pressure chamber 46, which is now of considerably larger volume. Fluid 44 also fills ports 47 and that portion of piston chamber 54 not occupied by the control valve assembly discussed now in some detail.

To the underside of piston head 35, a hollow pipe 81 is connected in such manner as to extend down into chamber 54. Disposed through the wall thereof at predetermined distances along the length thereof is a plurality of upper and lower metering orifices 82 and 83, respectively. And located for slidable movement within the hollow of pipe 81 is a sleeve 84, which during normal operation, abuts the underside of head 35. A plurality of slots or holes 85 and 86 are located in the wall of sleeve 84 at such positions that they respectively coincide with metering orifices 82 and 83, when sleeve 84 moves out of abutment with the underside of piston head 35, but allows said orifices 82 and 83 to remain closed during normal, non-impact shock absorber operation.

Near the end of pipe 81 opposite the end thereof connected to head 35 is a plurality of external threads 87 and a bearing surface 88. An end cap 89 having internal threads 91 (that are complementary with the aforesaid external threads 87) is screwed on the end of pipe 81. To insure a fluid seal between threaded pipe 81 and end cap 89, a groove 92 is located around the inside periphery of cap 89, and a suitable O-ring 93 is disposed therein. Of course, when cap 89 is screwed tightly on pipe 81, O-ring 93 is pressed against bearing surface 88 with sufficient force to provide a hydraulic seal thereat.

Between the lower end of sleeve 84 and the upper inside surface of end cap 89, a resilient means, such as a coil spring 94, is disposed in such manner as to urge sleeve 84 toward abutment with the underside of head 35, and thereby cause metering orifices 82 and 83 to be closed at that time.

Located in the lower end of pipe 81 (as viewed in FIG. 3) is a pair of diametrically opposed, longitudinally disposed guide grooves 96 and 97. And attached to the end of sleeve 84 — as by press fit or other appropriate attachment means — is a keeper pin 98 of such length that it will extend into and slide longitudinally within the guide grooves 96 and 97, thereby preventing rotation of sleeve 84 whenever sleeve 84 moves up and down within pipe 81, due to the forces of acceleration being applied thereto. Obviously, inasmuch as keeper pin 98 cannot rotate, and since it is connected to sleeve 84, sleeve 84 cannot rotate either; hence, slots 85 and 86 will always be positioned in such places as will allow them to coincide with and thus open metering orifices 82 and 83 whenever sleeve 84 moves out of abutment with the underside of piston head 35, so as to timely allow passage of the hydraulic fluid from chamber 46, through ports 47, through orifices 82 and 83, through slots 85 and 86, through the hollow of sleeve 84 and bore 36 or metering pin 34, and back into the hydraulic reservoir of cylinder housing 42 above wall 31.

As previously indicated, FIG. 4 illustrates a very generalized but typical version of a system that could incorporate the subject invention to an advantage. It is portrayed herewith to insure that it is understood that the invention has broad utility, although it is particularly useful in aircraft landing gears, as well.

For example, a utilization apparatus 110 (such as an airplane airframe) may be physically connected through a suitable hinge joint 111 to one end of a shock absorber 112 of the type of this invention, with the other end thereof likewise physically connected through a suitable hinge joint 113 to another utilization apparatus 114 (such as, for instance, airplane wheels). In addition, still another hinge joint 115 may be physically connected to hinge joints 111 and 113, and it is shown in this particular manner merely to disclose that the physical structure thereof should be such as will allow straight line, telescopic motion to occur within shock absorber 112. Obviously, other structural configurations would suffice for such purpose, as well; hence, the possible applications of the invention are practically unlimited.

Of course the aforementioned elements 111 through 115 constitute a representative elastic suspension system 116 (such as, perhaps, an aircraft landing gear).

As shown in FIG. 4, a carrier deck 117 may supply impact forces 118 to utilization apparatus 114, in the event such apparatus happens to be the wheels of an airplane landing thereon. It is shown in this manner for the purpose of providing clarity for one specific application of the invention, although it would be obvious to the artisan that such arrangement could be useful in other applications, too.

FIG. 5 graphically illustrates the several loads encountered by shock struts in an aircraft landing gear as a result of impact thereof on aircraft carrier deck with and without arresting cables during high sink landings under different operational conditions. Although different loads will occur for different sizes, weights, and landing speeds of aircraft, the curves of FIG. 3 may be considered as being typical for comparative purposes.

Solid line curve 121 indicates the shock strut loading encountered by an aircraft landing on an aircraft carrier deck without arresting cable impact and without the subject alleviator or shock absorber being incorporated in the landing gear thereof.

Short dashed line 122 indicates the shock strut loading encountered by the same aircraft landing on a carrier deck with arresting cable impact but without the subject invention being incorporated in the landing gear thereof.

Dash-dot line curve 123 indicates the shock strut loading encountered by the same aircraft landing on a carrier deck with arresting cable impact but without the subject invention being incorporated in the landing gear thereof.

Obviously, the aforementioned curves are all plotted on a single graph having load in pounds as the ordinate thereof and time in seconds as the abscissa thereof, in order to facilitate the making of comparisons of the various loads encountered as a result of the occurrence of several different operational and structural combinations. They, incidentally, will be explained more fully during the discussion of the operation of the invention presented below.

MODE OF OPERATION

The operation of the subject invention will now be discussed briefly in conjunction with all of the figures of the drawing.

Because the device constituting this invention may have any geometrical configuration that will give it such physical characteristics as will allow it to be included as a part of any aircraft landing gear — or, for that matter, as a part of any elastic suspension system in which the motion of the relatively moving members thereof is preferably controlled for restoration of equilibrium or other dampening purposes — the external appearance and the design of the internal structure of the shock absorbers of FIG. 1 may be whatever will provide optimum operation therefor. Thus, it should be understood that FIG. 1 is merely exemplary and that it is only disclosed to show one preferred embodiment of the invention.

In the telescopic version of the shock absorber 11 of FIG. 1, eyes 12 and 19 are connected to the relatively moving parts that are to be shocked cushioned, respectively. Because the various and sundry applications of shock absorber 11 are too numerous to depict in the drawing or mentioned in this specification, they have not been disclosed specifically, other than to indicate that there are many thereof. So, for the purpose of keeping this case as simple as possible, it will be considered that shock absorber 11 is incorporated in a proper conventional manner in the landing gear (not shown) of an aircraft in which the sprung weight thereof exceeds the unsprung weight thereof and, consequently, any oscillatory vibration or excessive impact loading problems that would ordinarily exist therebetween during the landing of said aircraft is alleviated to a considerable extent by the invention.

As is well known in the aircraft art, when an aircraft lands on a runway or other surface — be it at an airport, in a rough field, or on an aircraft carrier deck — considerable stress occurs within the entire structure of the landing gear and, unfortunately, some of it is transmitted to the frame or fuselage of the craft. However, it has long been determined that the use of landing gear type of pressure relief mechanisms between the aircraft wheels and the air frame considerably reduce the stresses in both thereof, especially during high impact landings of large, heavy airplanes. Moreover, it is also well known and conventional to use shock absorbers in conjunction with landing gear pressure relief mechanisms, and that the proper control thereof provides an additional reduction in the aforesaid stresses, thereby increasing the life, efficiency, and safety of landing gears and landing gear — air frame combinations. This is true with respect to ordinary airplanes landing on conventional airport runways; however, it is even more evident during landings on rough terrain or on tossing aircraft carrier decks which contain arresting cables for stopping airplanes as soon as possible after they touch down. With such exemplarily settings in mind, the specific operational characteristics of the subject shock absorber will now be discussed in detail.

Being an acceleration sensitive device, the subject shock absorber will function normally until it is exposed to the shock load of a bump, whereupon piston 16 is moved rapidly enough within cylinder 15 by a forcing acceleration to cause the inventive portion of the subject shock absorber to become operative. When said forcing acceleration is of sufficient magnitude to cause the unseating of control mass 55, it will, relatively speaking, move downwardly (as viewed in FIG. 2) along pipe 37, thereby compressing spring 63 and subsequently opening upper and lower metering orifices 39 and 41. At that time, that portion of hydraulic oil 44 contained within high pressure chamber 46 is ported through chamber ports 47, through metering orifices 39 and 41, up through the hollow or relief passage of metering pin 34, into compressed air chamber 46 and back into reservoir pool 44. Such fluid flow, of course, allows a controlled pressure release to occur within high pressure chamber 46, which, in turn, allows the piston 16 to be moved and compressed further into cylinder 15, in accordance with the amount of acceleration to which body 55 was exposed during impact, thereby cushioning the forces of said impact as far as the device connected to cylinder 15 is concerned. After the bump has been traversed, control spring 63 will cause body mass 55 to be seated against the lower surface of wall 35, closing metering orifices 39 and 41, after which the entire shock absorber will otherwise function in a normal fashion again.

The proper design of the mass of body 55, the size of orifices 39 and 41, and the viscosity of the hydraulic oil 44 will, of course, cause the operation of the shock absorber to be optimized for any given size shock absorbers and any given operational circumstances.

One of the more important advantages of this type of device lies in the fact that the sprung air frame mass of an airplane invariably has an inertia that is large compared to the inertia of the unsprung portion of the landing gear; therefore, the subject invention allows the unsprung landing gear mass to pulse quickly when under the influence of high accelerations resulting from high impact forces. This, in turn, allows rapid oscillation of the unsprung landing gear mass without attendant deleterious high impulse loading of the air frame of the airplane to occur, which would otherwise adversely affect the dynamic stability and perhaps pilot control thereof.

The operation of the embodiment of FIG. 3 is very similar to that of the embodiment of FIG. 2. Therefore, it will be discussed very briefly, with emphasis only on the acceleration sensitive valve assembly.

When an impact force is applied to the bottom of piston 16 (as viewed in FIG. 3), sleeve 84, due to its inertia, tends to remain stationary and, thus, relatively speaking, slides downward within pipe 81 to cause orifices 82 and 83 to be opened by slots 85 and 86, respectively. As a result, the high pressure hydraulic fluid rapidly flows therethrough into the hollow of sleeve 84, up through bore 36 in piston head 35 and metering pin 34 and into the compressed air-hydraulic fluid reservoir above wall 31 in cylinder housing 42. Such rapid flow, in turn, effectively reduces the pressure in chamber 46 between the top of piston head 35 and the bottom of wall 31, to thereby permit the rapid but cushioned movement of piston 16 further into cylinder 15. Of course, a series of such impact forces may occur, and, hence, piston 16 is forced to move up and down within cylinder 15. And each time it does, acceleration sensitive sleeve 84 functions as indicated above.

Referring now to FIG. 5, there is shown a load-time diagram which was calculated for a main gear strut of the type shown in FIG. 3; however, by analogy, it is pertinent to the operation of the species of FIG. 2, too, because the inventive concepts existing therein are substantially identical to those of the device of FIG. 3, even though the respective structures thereof are somewhat different.

As may readily be seen from the exemplary curves of FIG. 5, the various and sundry cushioning effects encountered vary according to prevailing landing conditions and whether or not the shock strut constituting the instant invention is included in the landing gear of the airplane. For example, curve 121 shows shock strut load vs. time for the situation where an aircraft is landed on a carrier deck with the subject shock absorber omitted from its landing gear and with the wheels encountering no restraining cable. Although, shock oscillation occurs, it is not too great, and thus the strain on the landing gear may not be excessive. In such case, the oscillations shown are attributable to the natural frequency of oscillation of the landing gear-aircraft system in reaction to the initial transducer impact. However, when a restraining cable is used and encountered by the wheels of the landing aircraft without benefit of the subject alleviator, curve 122 shows that the shock strut load vs. time is quite large (relative to the aforementioned condition) and, thus, the strain on the landing gear could be so great as to cause impairment thereof and perhaps cause the air frame of the airplane to crash into the carrier deck - probably to the detriment of the pilot and cargo, as well as causing damage to the airplane and the carrier deck. Accordingly, it may readily be seen that if improvement is desired, a suitable shock absorber must be incorporated in the airplane's landing gear.

When the subject shock absorber is incorporated in the landing gear, the shock strut load vs. time which occurs when an arresting cable is encountered is depicted in curve 123.

The oscillations of curves 122 and 123 are attributable to the touchdown impact and the briefly subsequent cable impact.

Although the loading force of curve 123 is oscillatory and greater than it would be without an impact cable, it is considerably less than the situation of arresting cable and no shock absorbers. Therefore, for this particular purpose — which should only be considered as exemplary — the subject invention vastly improves the shock loading characteristics of a high mass airplane fuselage when it is combined with a relatively low mass landing gear, thereby increasing the life, safety, versatility, etc., of all concerned.

As implied by the system of FIG. 4, substantially comparable performance will occur in even a generalized system, regardless of the respective geometrical configurations.

As implied by the general structural configuration of the system of FIG. 4, the performance thereof is substantially comparable to the performance discussed above in conjunction with the devices of FIGS. 1, 2, and 3, and possible associated equipment. Therefore, the load-time curves of FIG. 5, by analogy, are applicable thereto also, although obviously a different family of such curves would be obtained for different relative masses of utilization apparatus 110 and 114.

In view of the foregoing, it may readily be seen that the unique shock absorber constituting this invention produces results heretofore unobtainable from the prior art devices, and especially from those prior art devices which are intended to control the loading and motion of large inertia apparatus — such as, for example, the large, heavy fuselages of airplanes — and relatively small inertia devices — such as, for example, the unsprung smaller and lighter weight portions of the landing gears of said airplanes.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. In a pressurized air-hydraulic shock absorber, the combination comprising:

cylinder means, having a closed end and an open end;

means attached to said cylinder means for the connection thereof to a first predetermined utilization apparatus;

a first wall located a predetermined intermediate position along the length of said cylinder means in such manner as to form a cylindrical chamber between it and the aforesaid closed end thereof;

a metering orifice located in the center of said first wall;

piston means, having a head and a housing extending therefrom, telescopically mounted for slidable disposition within said cylinder means;

a plurality of ports disposed through the head of said piston means;

a second wall located within the housing of said piston means in such manner as to form a piston chamber between it and the head thereof;

a metering pin means, having an elongated barrel which is configured in such predetermined manner as to have a first outside diameter at one end thereof that provides a slip-fit with the inside diameter of the aforesaid metering orifice when located therein and a predetermined second diameter at the other end thereof that is smaller than said first outside diameter, connected to one side of the head of said piston means in such manner that the smaller diameter end thereof extends through said metering orifice and a predetermined distance into said cylindrical chamber;

a continuous bore extending through the head of said piston and the entire length of said metering pin means;

a hollow pipe means, one end of which is connected to the other side of the head of said piston means in such manner as to cause it to extend a predetermined distance into said piston chamber and effect a continuous passageway between the hollow thereof and the aforesaid bore;

means connected to the other end of said hollow pipe means for effecting the closure thereof;

passage means extending through the wall of said hollow pipe means;

control means, having a mass that is responsive to predetermined accelerations, slidably mounted in contiguous disposition with said hollow pipe means in such manner that it is movable into and out of abutment with the head of said piston means and will close and variable open the aforesaid passage means when so positioned, respectively;

means, having a predetermined compression rate, effectively mounted between the end closure means of said hollow pipe means and said control means for resiliently urging said control means toward the position of abutment with the head of said piston means and thereby effect closure of the aforesaid passage means;

hydraulic fluid means disposed so as to partially fill said cylindrical chamber to a predetermined level and completely fill said piston chamber, the ports extending through the head of said piston means, and the space between the head of said piston means and the aforesaid first wall of said cylinder means;

means connected to said cylinder means and disposed in slidable contact with the external surface of the housing of said piston means for effecting a hydraulic fluid seal therebetween when said piston means is telescopically disposed therein; and means connected to said piston means for the connection thereof to a second predetermined utilization apparatus.

2. The device of claim 1, wherein said means connected to the other end of said hollow pipe means for effecting the closure thereof comprises a solid wall integrally attached thereto.

3. The device of claim 1, wherein said means connected to the other end of said hollow pipe means for effecting the closure thereof comprises:
   a solid wall; and
   an end flange connected to said solid wall in such manner as to provide a stop means for that end of the aforesaid resiliently urging means which is opposite said control means.

4. The device of claim 1, wherein said control means, having a mass that is responsive to predetermined accelerations, slidably mounted in contiguous disposition with said hollow pipe means in such manner that it is movable into and out of abutment with the head of said piston means and will close and variably open the aforesaid passage means when so positioned, respectively, comprises:
   a body of revolution, having a longitudinal axis and a hole extending through said body of revolution along the longitudinal axis thereof, slidably mounted on the outside of said hollow pipe means;
   a face located at one end of said body of revolution and disposed normal to the longitudinal axis thereof adapted for abutment with the head of said piston means; and
   flange means connected to said body of revolution in such manner as to extend therefrom in a plane that is substantially perpendicular to the longitudinal axis thereof.

5. The device of claim 1, wherein said control means, having a mass that is responsive to predetermined accelerations, slidably mounted in contiguous disposition with said hollow pipe means in such manner that it is movable into and out of abutment with the head of said piston means and will close and variably open the aforesaid passage means when so positioned, respectively, comprises:
   a hollow sleeve slidably mounted within said hollow pipe means for abutment of one end thereof with the head of said piston means; and
   aperture means located through the wall of said hollow sleeve at such position along the length thereof that it coincides with the passage means of said hollow pipe means as said sleeve moves out of abutment with the head of said piston means.

6. The device of claim 1, wherein said means, having a predetermined compression rate, effectively mounted between the end closure means of said hollow pipe means and said control means for resiliently urging said control means toward the position of abutment with the head of said piston means and thereby effect closure of the aforesaid passage means comprises a coil spring.

7. The device of claim 1, wherein said means, having a predetermined compression rate, effectively mounted between the end closure means of said hollow pipe means and said control means for resiliently urging said control means toward the position of abutment with the head of said piston means and thereby effect closure of the aforesaid passage means comprises:
   a coil spring; and
   means connected to the end closure means of said hollow pipe means for effectively restraining the movement of that end of said coil spring which is opposite said control means.

8. The device of claim 1, wherein said hydraulic fluid means disposed so as to partially fill said cylindrical chamber to a predetermined level and completely fill said piston chamber, the ports extending through the head of said piston means, and the space between the head of said piston means and the aforesaid first wall of said cylinder means comprises a liquid having a predetermined viscosity.

9. The device of claim 1, wherein said means connected to said cylinder means and disposed in slidable contact with the external surface of the housing of said piston means for effecting a hydraulic seal therebetween when said piston means is telescopically disposed therein comprises a packing gland.

10. The invention of claim 1 further characterized by a pair of fittings attached to said cylinder means in such manner as to provide means for supplying compressed air and hydraulic fluid thereto, respectively.

11. The device of claim 1, wherein said means connected to the other end of said hollow pipe means for effecting the closure thereof comprises:
   a plurality of threads located around the outside of that end of said hollow pipe means to be closed; and
   a cap, having internal threads that are compatible with the aforesaid plurality of threads, screwed on the end of said hollow pipe means.

12. The invention of claim 11, further characterized by means disposed between said hollow pipe means and said cap for effecting a fluid seal therebetween.

13. The invention of claim 1, further characterized by means connected between said hollow pipe means and said control means for limiting the rotation of said control means a predetermined amount with respect to said hollow pipe means.

14. The device of claim 13, wherein said means connected between said hollow pipe means and said control means for limiting the rotation of said control means a predetermined amount with respect to said hollow pipe means comprises:
- a hole located in said control means which extends therethrough in such manner as to provide an open passageway to the external surface of said hollow pipe means;
- a groove located in the outer surface of said hollow pipe means, said groove being elongated in the direction of travel of said control means, and located in contiguous disposition with the aforesaid hole for the entire length thereof; and
- a pin removably press fitted within said hole in such manner as to cause the inner end thereof to slidably fit in said groove and be travel limited thereby.

15. The device of claim 13, wherein said means connected between said hollow pipe means and said control means for limiting the rotation of said control means a predetermined amount with respect to said hollow pipe means comprises:
- at least one groove, elongated in the direction of travel of said control means, located in the inner surface of said hollow pipe means; and
- means connected to said control means extending into said groove in such manner as to provide a slidable fit and a rotational limitation therebetween.

16. The device of claim 15, wherein said means connected to said control means and extending into said groove in such manner as to provide a slidable fit and a rotational limitation therebetween comprises a keeper pin.

* * * * *